Feb. 16, 1932.  R. H. DIETRICH  1,845,401
FOLDING LAMP FOR AUTOMOBILE REAR SEATS
Filed July 14, 1930  2 Sheets-Sheet 1
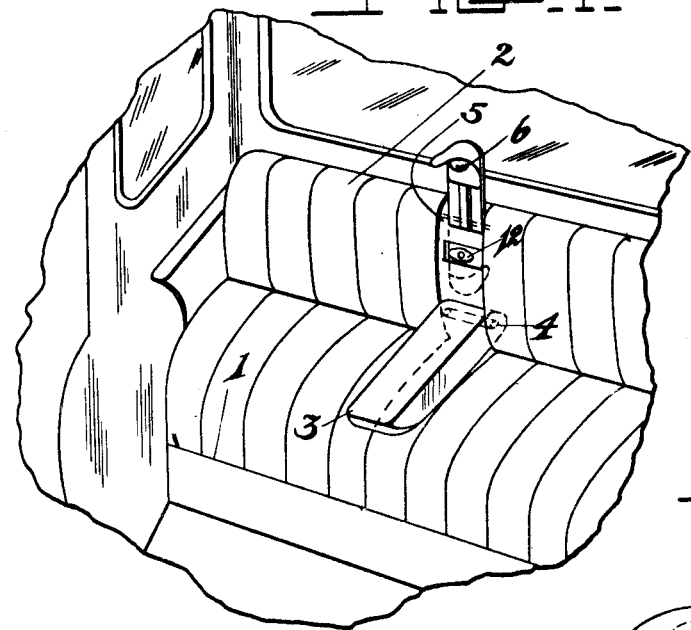
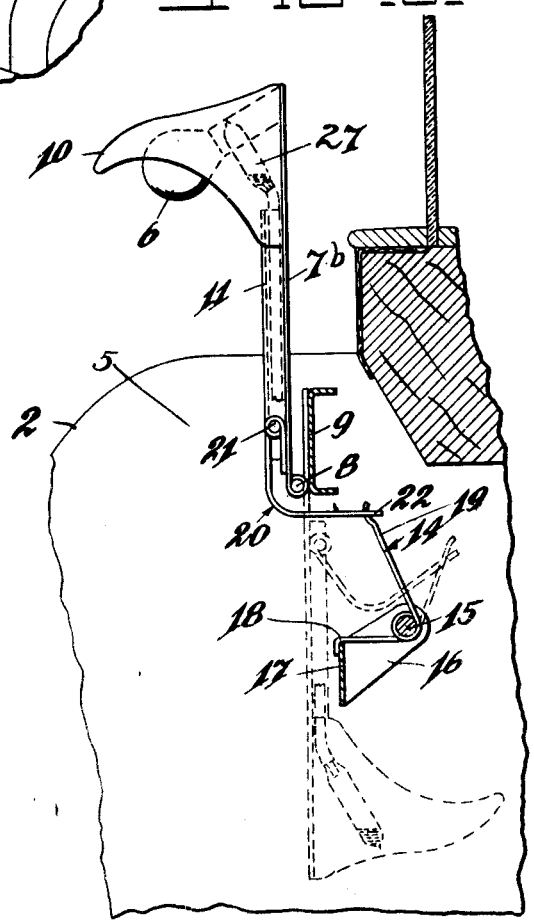
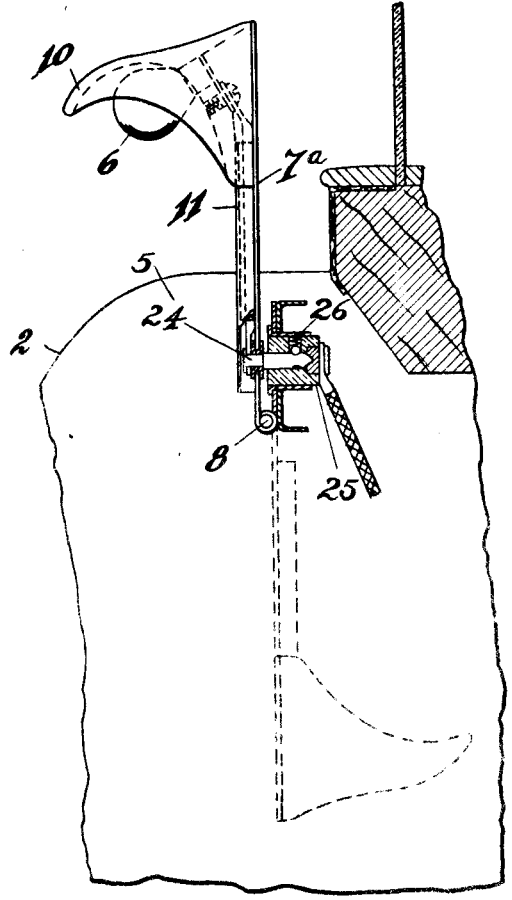
INVENTOR:
Raymond H. Dietrich,
BY Bodell & Thompson
ATTORNEYS.

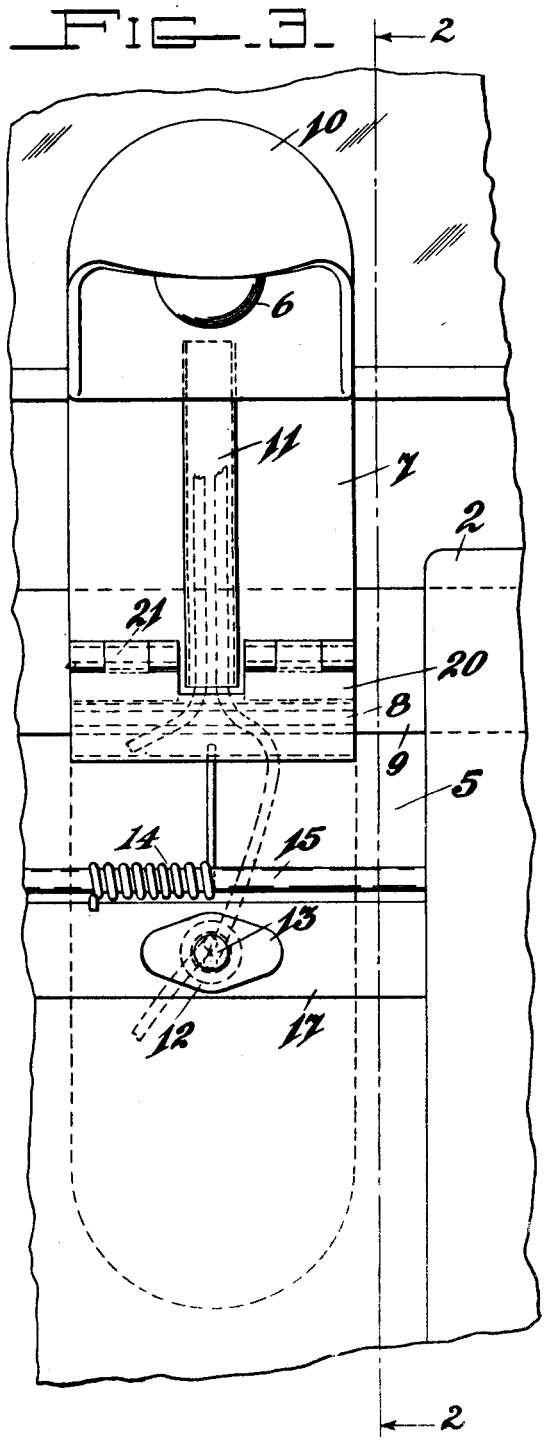
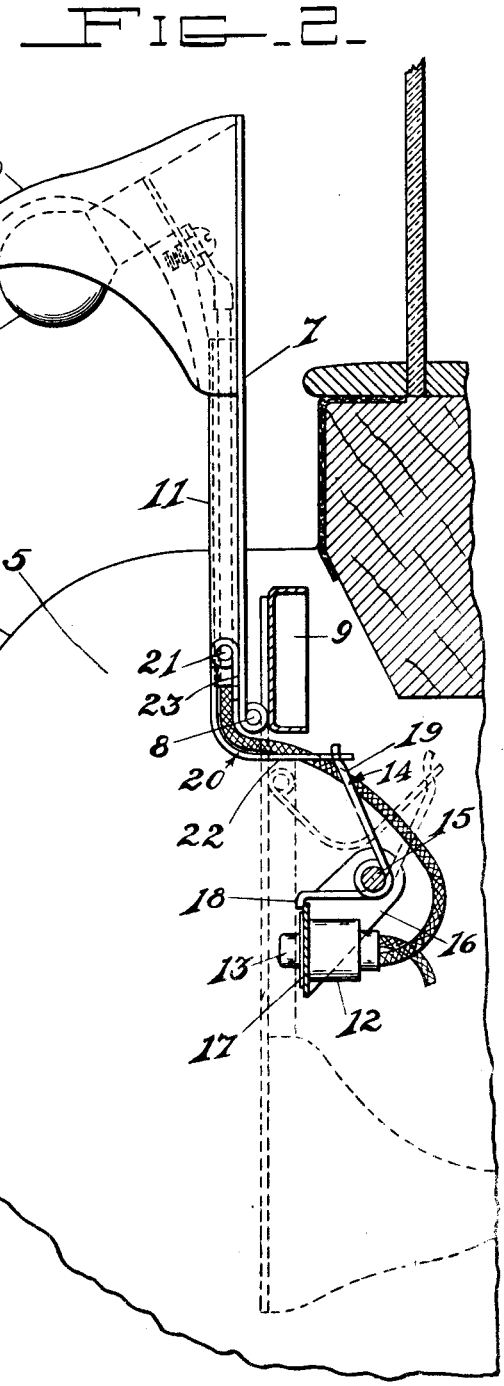

Patented Feb. 16, 1932

1,845,401

UNITED STATES PATENT OFFICE

RAYMOND H. DIETRICH, OF DETROIT, MICHIGAN, ASSIGNOR TO FRANKLIN DEVELOPMENT CORPORATION, OF SYRACUSE, NEW YORK, A CORPORATION OF NEW YORK

FOLDING LAMP FOR AUTOMOBILE REAR SEATS

Application filed July 14, 1930. Serial No. 467,728.

This invention has for its object, a reading lamp for vehicle seats, particularly the rear seats of automobiles, which lamp is normally concealed in the back of the seat, and shiftable, when needed, into a position out of the back, or the upholstery thereof, into a position above the back of the seat, or above the shoulders of the occupants of the seat.

It further has for its object, such a reading lamp so combined with the folding arm rest in the center of the rear seat, that the lamp is normally concealed by the folding arm rest.

The invention consists in the novel features and in the combinations and constructions hereinafter set forth and claimed.

In describing this invention, reference is had to the accompanying drawings, in which like characters designate corresponding parts in all the views.

Figure 1 is a perspective view of the rear seat of an automobile provided with this reading lamp.

Figure 2 is an enlarged fragmentary vertical sectional view through the recess, the seat back, or the upholstery thereof in which the lamp is normally located, taken on line 2—2 of Figure 3.

Figure 3 is a face view of parts seen in Figure 2.

Figures 4 and 5 are views similar to Figure 2 showing other forms of switch mechanism for controlling the lamp.

1 designates the seat bottom, and 2 the seat back of an automobile seat.

3 designates the folding arm rest which is pivoted at its lower end at 4 and moved into and out of an upright recess 5 in the back, or the upholstery thereof, it normally being flush with the back, and being movable downwardly and forwardly over the seat bottom to form an arm rest, and dividing the seat.

6 designates an electric lamp carried by a suitable support as an arm or bracket 7 normally located in the recess 5 and movable out of the recess upwardly into a position above the seat back, or above the shoulder level of the occupants of the seat.

In the illustrated embodiment of my invention, the support or bracket 7 is pivoted at 8 to a fixed support 9 in the recess 5, and is normally arranged in the dotted line position Figure 2, and movable into the full line position about the pivot 8. The arm or lamp bracket 7 is usually formed of sheet metal and is flat, it carrying a suitable lamp socket at its outer end in which the lamp 6 is mounted. It is also provided with a hood 10 at its outer end, over the lamp 6.

The service wires for the lamp extend along the arm 7 and are concealed in a suitable conduit 11. The flow of current to the lamp is controlled by a normally open switch 12 which is held open by the arm or bracket 7 when folded into the recess 5. As shown in Figures 2 and 3, this switch 12 is provided with a push button 13 arranged in the path of the arm 7 to be depressed thereby when the arm is folded into the recess 5, the push button having spring means not shown, tending to move it outwardly and hence, close the switch when the lamp and its support is swung out of the recess.

The lamp support is held in its position assumed when in the recess, that is, the dotted line position Figure 2, and in its operative position when swung out of the recess, that is, the full line position, Figure 2, by spring means as a spring 14 coiled about a shaft 15 carried by bracekt arms 16 suitably mounted on a transverse frame member 17 in the recess, one arm 18 of the spring thrusting against the frame member 17, and the other arm 19 thrusting against a lever element 20 pivoted at 21 to the lamp bracket 7 eccentric to the pivot 8 and having an angular arm 22 extending around the pivot 8 to the rear side of the lamp bracket arm. The pivot 21 is supported by a bracket 20 secured to the lamp bracket arm 7 above the pivot 8, when the lamp bracket is in its elevated position out of the recess 5. When the lamp bracket is folded into the recess, the spring arm 19 assumes the position shown in dotted lines Figure 2 and hence, tends to pull the lamp bracket into the recess and hold it against the push button 13. When the lamp bracket is swung to full position out of the recess, the spring arm 19 acts on the angular arm 20 to move it on its pivot 21 and tends to hold the lamp bracket in its open position.

In Figure 4, the lamp bracket 7ª is shown as provided with a plug 24 extending therefrom and for entering a socket 25 when the bracket is in its elevated position, the socket having terminals connected in the service wires and the plug being connected in circuit with the lamp. The plug coacts with a spring pressed wall poppet 26 in the socket, which holds the lamp in its elevated position against being vibrated out of its elevated position so as to break contact between the plug and the socket. When the lamp bracket 7ª is folded down into the dotted line position Figure 4, the plug moves out of the socket and breaks the circuit through the lamp, and when the lamp bracket is moved upwardly out of the recess, the plug enters the socket and connects the lamp into an electric circuit and also holds the lamp in its operative position.

In Figure 5, the lamp is controlled by a mercury tube switch 27 carried by the bracket 7ᵇ within the hood of the lamp. In the form shown in Figure 5, the same spring mechanism for holding the lamp bracket in the recess and in its elevated position out of the recess, is shown.

When the lamp bracket 7ᵇ is folded from the dotted line position to the full line position Figure 5, the mercury in the mercury tube 27 runs to the lower end of the tube and closes the circuit to the lamp. When the bracket is folded into the recess, the mercury flows to the opposite end of the tube and breaks the circuit.

In the operation of any form of my invention, the folding arm rest is folded downwardly into a position over the seat bottom, and the lamp bracket 7ᵇ folded upwardly. The arm rest may if desired be folded back into a position closing the recess. When the lamp is not in use, it is folded back into the recess, and the recess again closed by the folding arm rest. At all times, the folding arm rest can be used in the usual manner without using the lamp.

What I claim is:

1. In a seat comprising a seat bottom and a back, the back being formed with a recess, a lamp located in the recess and movable upwardly out of the recess, and a closure for the recess normally arranged with its outer face flush with the outer face of the remainder of the back, said closure being movable downwardly onto the seat bottom to form an arm rest.

2. In a seat comprising a seat bottom and a back, the back being formed with a recess, an electric lamp and support therefor mounted in the recess, the support being movable to carry the lamp upwardly out of the recess, a normally open electric switch operable to close the circuit through the lamp when the lamp support is swung out of the recess, and to open said circuit when the lamp and its support is moved into the recess, and a folding arm rest forming a closure for the recess, said rest being pivoted at its lower end to the back, and normally arranged flush with the remainder of the back, and movable on its pivot into a position overlying the seat bottom.

3. In a seat comprising a seat bottom, and a back, the back being formed with a recess, a lamp and carrier therefor located in the recess and movable upwardly and forwardly out of the recess, and a pivoted closure for the recess normally arranged with its outer face flush with the outer face of the remainder of the back, said closure being mounted to swing forwardly and downwardly into open position.

In testimony whereof, I have hereunto signed my name, at Syracuse, in the county of Onondaga, and State of New York, this 7th day of July, 1930.

RAYMOND H. DIETRICH.